United States Patent [19]
Sakakibara et al.

[11] Patent Number: 5,590,353
[45] Date of Patent: Dec. 31, 1996

[54] VECTOR PROCESSOR ADOPTING A MEMORY SKEWING SCHEME FOR PREVENTING DEGRADATION OF ACCESS PERFORMANCE

[75] Inventors: Tadayuki Sakakibara, Kunitachi; Teruo Tanaka, Hachioji; Yoshiko Tamaki, Kodaira, all of Japan; Katsuyoshi Kitai, Palo Alto, Calif.; Yasuhiro Inagami, Kodaira, Japan

[73] Assignee: Hitachi, Ltd., Tokyo, Japan

[21] Appl. No.: 275,388

[22] Filed: Jul. 15, 1994

[30] Foreign Application Priority Data

Jul. 15, 1993 [JP] Japan .................................. 5-175115

[51] Int. Cl.⁶ ................................................. G06F 15/16
[52] U.S. Cl. ........................ 395/800; 395/454; 395/732; 364/736; 364/DIG. 1; 364/232.21; 364/228.1
[58] Field of Search .................................. 395/800, 728, 395/732, 459; 364/736

[56] References Cited

U.S. PATENT DOCUMENTS

| | | | |
|---|---|---|---|
| 5,214,769 | 5/1993 | Uchida et al. | 395/425 |
| 5,276,902 | 1/1994 | Nakatani et al. | 395/800 |
| 5,388,247 | 2/1995 | Goodwin et al. | 395/425 |
| 5,392,443 | 2/1995 | Sakakibara et al. | 395/800 |
| 5,412,788 | 5/1995 | Collins et al. | 395/425 |

*Primary Examiner*—Mehmet B. Geckil
*Attorney, Agent, or Firm*—Antonelli, Terry, Stout & Kraus

[57] ABSTRACT

A vector processor includes a storage control apparatus which incorporates an access request buffer unit equipped with an address decoding unit having address decoder circuits corresponding to all models of the vector processors belonging to a same machine series. By using model ID signals, the address decoding is selectively enabled by a selector. The address decoding unit equalizes the periodicities at which the address assignments to the memory modules are skewed or shifted for all the element parallelism factors of the processors belonging to the same machine series. Access request queue is provided in a necessary number of stages in precedence to an access request priority determining unit incorporated in the storage control apparatus.

17 Claims, 18 Drawing Sheets

FIG. 8

| MM # | MM0 | MM1 | MM2 | MM3 |
|---|---|---|---|---|
| ADDRESS | <u>0</u> | 1 | 2 | 3 |
| | <u>4</u> | 5 | 6 | 7 |
| | <u>8</u> | 1 | 10 | 11 |
| | <u>12</u> | 13 | 14 | 15 |
| | <u>16</u> | 17 | 18 | 19 |
| | <u>20</u> | 21 | 22 | 23 |
| | <u>24</u> | 25 | 26 | 27 |
| | <u>28</u> | 29 | 30 | 31 |

THE UNDERLINED PORTIONS : ADDRESSES TO BE ACCESSED WITH STRIDE OF "4"

FIG. 9

| STRIDE | MULTIPLES OF "4" | MULTIPLES OF "2" EXCEPT THOSE OF "4" | OTHERS |
|---|---|---|---|
| ACCESS PROCESSING PERFORMANCE | 1/4 | 1/2 | 1 |

FIG. 11

| MM # | 0 | 1 | 2 | 3 |
|---|---|---|---|---|
| ADDRESS | _0_ | 1 | 2 | 3 |
| | 7 | _4_ | 5 | 6 |
| | 10 | 11 | _8_ | 9 |
| | 13 | 14 | 15 | _12_ |
| | _16_ | 17 | 18 | 19 |
| | 23 | _20_ | 21 | 22 |
| | 26 | 27 | _24_ | 25 |
| | 29 | 30 | 31 | _28_ |
| | _32_ | 33 | 34 | 35 |
| | 48 | 49 | 50 | 51 |

FIG. 12

| MM# | 0 | 1 | 2 | 3 | 4 | 5 | 6 | 7 |
|---|---|---|---|---|---|---|---|---|
| ADDRESS | <u>0</u> | 1 | 2 | 3 | 4 | 5 | 6 | 7 |
| | 15 | <u>8</u> | 9 | 10 | 11 | 12 | 13 | 14 |
| | 22 | 23 | <u>16</u> | 17 | 18 | 19 | 20 | 21 |
| | 29 | 30 | 31 | <u>24</u> | 25 | 26 | 27 | 28 |
| | 36 | 37 | 38 | 39 | <u>32</u> | 33 | 34 | 35 |

FIG. 13

| MM # | 0 | 1 | 2 | 3 |
|---|---|---|---|---|
| ADDRESS | 0 | 1 | 2 | 3 |
| | 4 | 5 | 6 | 7 |
| | 11 | 8 | 9 | 10 |
| | 15 | 12 | 13 | 14 |
| | 18 | 19 | 16 | 17 |
| | 22 | 23 | 20 | 21 |
| | 25 | 26 | 27 | 24 |
| | 29 | 30 | 31 | 28 |
| | 32 | 33 | 34 | 35 |
| | 36 | 37 | 38 | 39 |
| | 43 | 40 | 41 | 42 |
| | 47 | 44 | 45 | 46 |
| | 50 | 51 | 48 | 49 |
| | 54 | 55 | 52 | 53 |
| | 57 | 58 | 59 | 56 |
| | 61 | 62 | 63 | 60 |
| | 64 | 65 | 66 | 67 |
| | 68 | 69 | 70 | 71 |
| | 75 | 72 | 73 | 74 |
| | 79 | 76 | 77 | 78 |
| | 82 | 83 | 80 | 81 |
| | 86 | 87 | 84 | 85 |
| | 89 | 90 | 91 | 88 |
| | 93 | 84 | 95 | 92 |
| | 96 | 97 | 98 | 99 |
| | 100 | 101 | 102 | 103 |
| | 107 | 104 | 105 | 106 |
| | 111 | 108 | 109 | 110 |
| | 114 | 115 | 112 | 113 |
| | 118 | 119 | 116 | 117 |
| | 121 | 122 | 123 | 120 |
| | 125 | 126 | 127 | 124 |

| MM # | 0 | 1 | 2 | 3 |
|---|---|---|---|---|
| ADDRESS | 128 | 129 | 130 | 131 |
| | 132 | 133 | 134 | 135 |
| | 139 | 136 | 137 | 138 |
| | 143 | 140 | 141 | 142 |
| | 146 | 147 | 144 | 145 |
| | 150 | 151 | 148 | 149 |
| | 153 | 154 | 155 | 152 |
| | 157 | 158 | 159 | 156 |
| | 160 | 161 | 162 | 163 |
| | 164 | 165 | 166 | 167 |
| | 171 | 168 | 169 | 170 |
| | 175 | 172 | 173 | 174 |
| | 178 | 179 | 176 | 177 |
| | 182 | 183 | 180 | 181 |
| | 185 | 186 | 187 | 184 |
| | 189 | 190 | 191 | 188 |
| | 192 | 193 | 194 | 195 |
| | 196 | 197 | 198 | 199 |
| | 203 | 200 | 201 | 202 |
| | 207 | 204 | 205 | 206 |
| | 210 | 211 | 208 | 209 |
| | 214 | 215 | 212 | 213 |
| | 217 | 218 | 219 | 216 |
| | 221 | 222 | 223 | 220 |
| | 224 | 225 | 226 | 227 |
| | 228 | 229 | 230 | 231 |
| | 235 | 232 | 233 | 234 |
| | 239 | 236 | 237 | 238 |
| | 242 | 243 | 240 | 241 |
| | 246 | 247 | 244 | 245 |
| | 249 | 250 | 251 | 248 |
| | 253 | 254 | 255 | 252 |

FIG. 14

| MM# | 0 | 1 | 2 | 3 |
|---|---|---|---|---|
| ADDRESS | 256 | 257 | 258 | 259 |
| | 260 | 261 | 262 | 263 |
| | 267 | 264 | 265 | 266 |
| | 271 | 268 | 269 | 270 |
| | 274 | 275 | 272 | 273 |
| | 278 | 279 | 276 | 277 |
| | 281 | 282 | 283 | 280 |
| | 285 | 286 | 287 | 284 |
| | 288 | 289 | 290 | 291 |
| | 292 | 293 | 294 | 295 |
| | 299 | 296 | 297 | 298 |
| | 303 | 300 | 301 | 302 |
| | 306 | 307 | 304 | 305 |
| | 310 | 311 | 308 | 309 |
| | 313 | 314 | 315 | 312 |
| | 317 | 318 | 319 | 316 |
| | 320 | 321 | 322 | 323 |
| | 324 | 325 | 326 | 327 |
| | 331 | 328 | 329 | 330 |
| | 335 | 332 | 333 | 334 |
| | 338 | 339 | 336 | 337 |
| | 342 | 343 | 340 | 341 |
| | 345 | 346 | 347 | 344 |
| | 349 | 350 | 351 | 348 |
| | 352 | 353 | 354 | 355 |
| | 356 | 357 | 358 | 359 |
| | 363 | 360 | 361 | 362 |
| | 367 | 364 | 365 | 366 |
| | 370 | 371 | 368 | 369 |
| | 374 | 375 | 372 | 373 |
| | 377 | 378 | 379 | 376 |
| | 381 | 382 | 383 | 380 |

| MM# | 0 | 1 | 2 | 3 |
|---|---|---|---|---|
| ADDRESS | 384 | 385 | 386 | 387 |
| | 388 | 389 | 390 | 391 |
| | 395 | 392 | 393 | 394 |
| | 399 | 396 | 397 | 398 |
| | 402 | 403 | 400 | 401 |
| | 406 | 407 | 404 | 405 |
| | 409 | 410 | 411 | 408 |
| | 413 | 414 | 415 | 412 |
| | 416 | 417 | 418 | 419 |
| | 420 | 421 | 422 | 423 |
| | 427 | 424 | 425 | 426 |
| | 431 | 428 | 429 | 430 |
| | 434 | 435 | 432 | 433 |
| | 438 | 439 | 436 | 437 |
| | 441 | 442 | 443 | 440 |
| | 445 | 446 | 447 | 444 |
| | 448 | 449 | 450 | 451 |
| | 452 | 453 | 454 | 455 |
| | 459 | 456 | 457 | 458 |
| | 463 | 460 | 461 | 462 |
| | 466 | 467 | 464 | 465 |
| | 470 | 471 | 468 | 469 |
| | 473 | 474 | 475 | 472 |
| | 477 | 478 | 479 | 476 |
| | 480 | 481 | 482 | 483 |
| | 484 | 485 | 486 | 487 |
| | 491 | 488 | 489 | 490 |
| | 495 | 492 | 493 | 494 |
| | 498 | 499 | 496 | 497 |
| | 502 | 503 | 500 | 501 |
| | 505 | 506 | 507 | 504 |
| | 509 | 510 | 511 | 508 |

FIG. 15

| STRIDE | MULTIPLES OF "16" | MULTIPLES OF "8" EXCEPT THOSE OF "16" | OTHERS |
|---|---|---|---|
| ACCESS PROCESSING PERFORMANCE | 1/4 | 1/2 | 1 |

FIG. 16

| STRIDE | MULTIPLES OF "32" | MULTIPLES OF "16" EXCEPT THOSE OF "32" | OTHERS |
|---|---|---|---|
| ACCESS PROCESSING PERFORMANCE | 1/4 | 1/2 | 1 |

FIG. 17

| STRIDE | MULTIPLES OF "64" | MULTIPLES OF "32" EXCEPT THOSE OF "64" | MULTIPLES OF "16" EXCEPT THOSE OF "32" | OTHERS |
|---|---|---|---|---|
| ACCESS PROCESSING PERFORMANCE | 1/8 | 1/4 | 1/2 | 1 |

FIG. 19

| STRIDE | 1 | 2 | 3 | 4 | 5 | 6 | 7 | 8 | 9 | 10 | 11 | 12 |
|---|---|---|---|---|---|---|---|---|---|---|---|---|
| ACCESS PROCESSING PERFORMANCE | 1 | 1 | 2/3 | 1 | 4/5 | 1 | 2/5 | 1 | 2/3 | 1 | 2/3 | 1 |

| STRIDE | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|
| ACCESS PROCESSING PERFORMANCE | 4/5 | 1 | 7/8 | 1/2 | 1 | 1 | 4/5 | 1 | 2/3 | 1 | 2/3 | 1 | 2/5 | 1 | 4/5 | 1 | 2/3 | 1 | 1 | 1/4 |

FIG. 20

| RQ # | RQ0 | RQ1 | RQ2 | RQ3 |
|---|---|---|---|---|
| 1 | 0 | 7 | 14 | 21 |
| 2 | 28 | 35 | 42 | 49 |
| 3 | 56 | 63 | 70 | 77 |
| 4 | 84 | 91 | 98 | 105 |
| 5 | 112 | 119 | 126 | 133 |
| 6 | 140 | 147 | 154 | 161 |
| 7 | 168 | 175 | 182 | 189 |
| 8 | 196 | 203 | 210 | 217 |
| 9 | 224 | 231 | 238 | 245 |
| 10 | 252 | 259 | 266 | 273 |
| 11 | 280 | 287 | 294 | 301 |
|  | 308 | 315 | 322 | 329 |
|  | ⋮ | ⋮ | ⋮ | ⋮ |

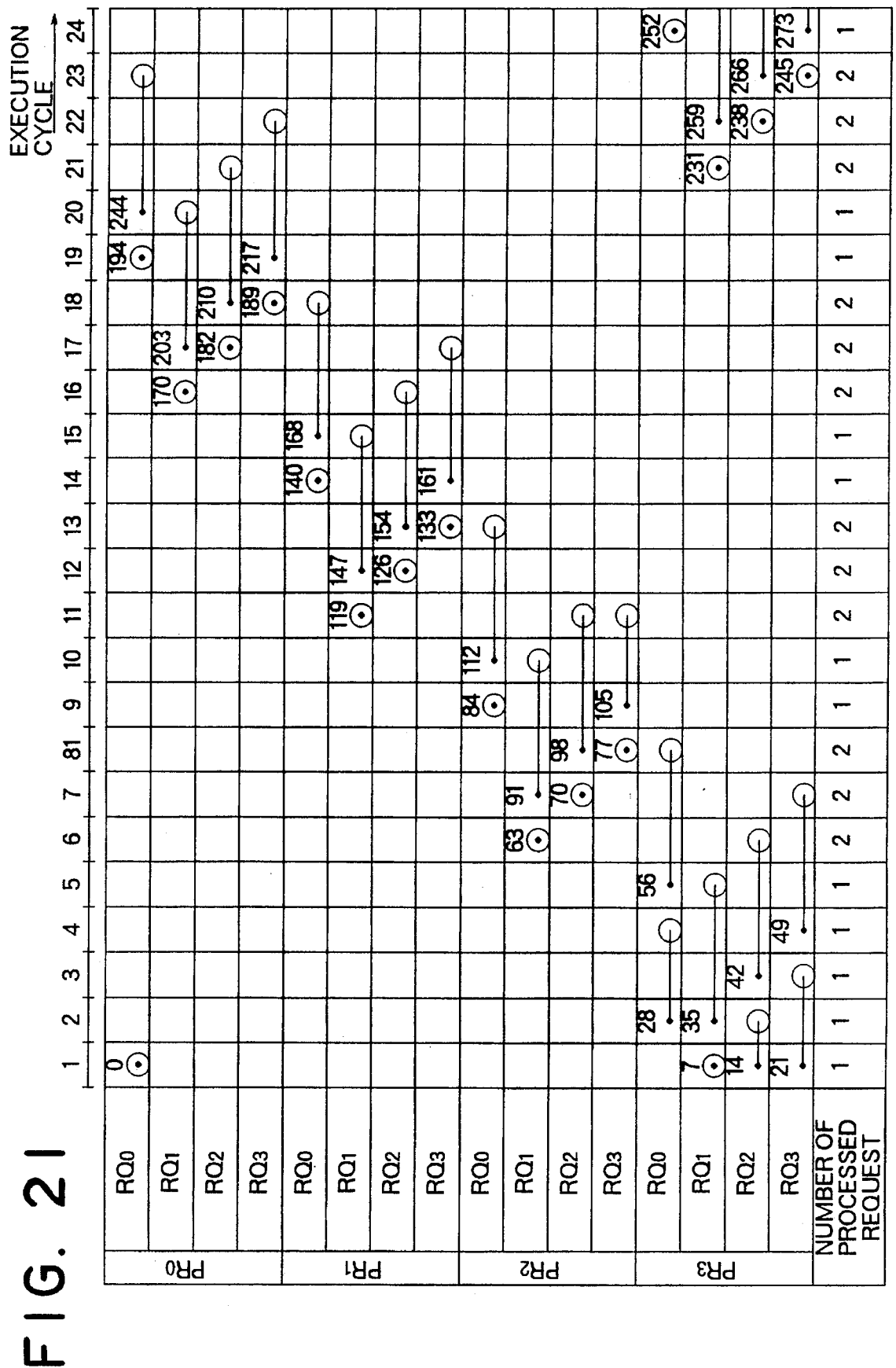

1

VECTOR PROCESSOR ADOPTING A MEMORY SKEWING SCHEME FOR PREVENTING DEGRADATION OF ACCESS PERFORMANCE

CROSS-REFERENCE TO RELATED U.S. PATENT APPLICATIONS (1) Sakakibara et al, U.S. patent application Ser. No. 07/855056 filed on Mar. 19, 1992, the disclosure of which is incorporated herein by reference.

(2) Sakakibara et al, U.S. patent application Ser. No. 08/170743 filed on Dec. 21, 1993.

BACKGROUND OF THE INVENTION

The present invention generally relates to a vector processor for processing in parallel a plurality of vector elements contained in the same vector data. More particularly, the present invention relates to a vector processor in which a memory skewing scheme is adopted for preventing access performance from degradation when accesses are made successively with addresses each incremented by a predetermined value.

When arrayed data are stored as vector data in a main storage of a vector processor, there is usually adopted a method of storing elements at each row of an array consecutively at successive memory locations. Consequently, the elements belonging to a same row of an array are successively accessed by means of a sequence of consecutive addresses, while the elements belonging to a same column are accessed by means of a sequence of addresses which are equally distanced from one another by a given incremental value (Hereinafter, this will be referred to as the stride).

In this conjunction, it is known that the access speed or rate (i.e., the rate at which the access is executed) will vary in dependence on methods of assigning addresses to the individual memory locations in a plurality of memory modules, which constitute a main storage. By way of example, as one of the conventional methods for the memory address assignment well known in the art, there may be mentioned an interleaving method or scheme. FIG. 8 of the accompanying drawings shows, by way of example, the addresses as assigned by the interleaving method in the case where the number of memory modules constituting a main storage is four. As can be seen in the figure, the four memory modules are sequentially allocated with the identifiers or numbers (hereinafter referred to as the ID numbers) "0", "1", "2" and "3", respectively, in this order, wherein a symbol "MM#" represents generally or collectively the memory module ID numbers. According to the illustrated interleaving scheme, consecutive addresses are assigned to the memory modules which differ sequentially from one to another.

At this juncture, it should be mentioned that the term "address" represents the number assigned or affixed to a memory location in a memory on an access-by-access basis. This definition obtains throughout the specification unless specified otherwise. Further, in the following description which is directed to the vector processors known heretofore, as well as the vector processors shown in conjunction with the exemplary embodiments of the invention, it is assumed that each memory access takes on a length equivalent to the data length of a single element of the vector data. To say in another way, an address is assigned to each vector data element.

According to the interleaving method described above, consecutive addresses are successively assigned to the memory modules which differ sequentially from one to another. Accordingly, in the memory accesses with the consecutive addresses, the mutually different memory modules are sequentially accessed. Thus, the memory access operation can be accomplished at a very high speed. However, in the case of the equi-distant accesses which are spaced from one another by a given value of the stride defined previously, it has been known that the accesses are concentrated to a particular one of the memory modules, incurring degradation in the access performance. FIG. 9 of the accompanying drawings shows relations between the strides and the memory access performance indexes. By way of example, in the case of the scheme illustrated in FIG. 4, the access with a stride of "4" presents a problem. More specifically, when the memory access is to be made with a stride of "4" sequentially, starting from the address "0", the accesses will then be made to the addresses "0", "4", "8", "12" . . . , and so forth sequentially in this order. In this conjunction, it will be noted that these addresses are all assigned to the memory module MM0. Thus, it becomes impossible to realize the access of high speed.

As the measures for coping with or mitigating such degradation in the memory access performance as mentioned above, there is known a so-called memory skewing scheme (or skewed storage scheme, to say in another way) according to which the address assignments to the memory modules are skewed, so to say. The mathematical basis for this memory skewing scheme is elucidated in D. J. Kuck: "ILLIAC IV SOFTWARE AND APPLICATION PROGRAMMING", IEEE Transactions on Computers, Vol. C-17, No. 8, pp. 758–770, (August 1968) or P. Budnik and D. J. Kuck: "THE ORGANIZATION AND USE OF A PARALLEL MEMORIES", IEEE Transactions on Computers, pp. 1566–1569, (December 1971). The memory skewing scheme is never limited definitely to a single method but has many variations and modifications, some of which are disclosed in D. T. Harper, III and J. R. Jump: "PERFORMANCE EVALUATION OF VECTOR ACCESS IN PARALLEL MEMORIES USING A SKEWED STORAGE SCHEME", IEEE Transactions on Computers, C-36 (12), pp. 1440–1449 (December 1987) or "PERFORMANCE EVALUATION OF VECTOR ACCESSES IN PARALLEL MEMORIES USING A SKEWED STORAGE SCHEME", Conf. Proc. of the 13th Annual International Symposium on Computer Architecture, pp. 324–328 (June 1986), IEEE, and U.S. Pat. No. 4,918,600. Description which follows will be directed to a vector processor in which the memory skewing scheme (or skewed storage scheme) is adopted and typical variations of the skewing scheme where the numbers of memory modules are four and eight, respectively.

Vector processors in which the memory skewing scheme is adopted are disclosed in U.S. Pat. Nos. 4,370,732 and 4,918,600. FIG. 10 shows a vector processor disclosed in U.S. Pat. No. 4,918,600.

In the figure, reference numeral 500 denotes a processor which sequentially issues access requests, numerals 510 to 513 denote memory modules, respectively, numerals 520 to 523 denote buffers for holding temporarily the access requests issued from the processor 500, and reference numerals 530 to 533 denote buffers for holding temporarily the data read out or retrieved from the memory modules 510 to 513, respectively. The memory module to which a given access request is to be sent is determined by an address mapping circuit 540 which serves to select the memory module of concern in accordance with the address information contained in that given access request. The processor 500 is capable of issue one access request in one cycle. The access request contains the address information on the basis of which the access request to the memory module to be accessed is issued. In the case of the prior art vector processor now under consideration, the access to one memory module requires four cycles. However, since four memory modules are sequentially accessed, the access request can be processed in every cycle. When a plurality of access requests are successively issued to one and the same memory module, those access requests which succeed to the preceding one are temporarily held by the buffer 520, 521, 522 or 523 during the period in which the memory module mentioned above is being accessed by the preceding access request. Thus, the succeeding access requests can be issued until the buffer 520, 521, 522 or 523 becomes full. On the other hand, buffers 530 to 533 serve to hold temporarily the data read out from the memory modules for sending them back to the processor 500 in the order in which the relevant access requests were issued from the processor 500.

FIGS. 11 and 12 of the accompanying drawings illustrate address assignments to memory modules in accordance with a first skewing scheme illustrated in FIGS. 4 and 5 of U.S. Pat. No. 4,918,600.

According to the illustrated memory skewing schemes, the memory modules are shifted or changed over from one to another one by one every time a number of addresses corresponding to that of the memory modules (four and eight in the case of the examples now shown in FIGS. 11 and 12) have been assigned. In this case, relation among the memory module ID number MM#, the address ADR and the number N of memory modules is given by the expression (1) mentioned below:

$$MM\# = (ADR + ADR \div N) \bmod N \quad (1)$$

where "mod N" represents modulo-N operation. Assuming, for example, that N=4, the address assignment is performed in such a way that the address "0" is assigned to the memory module 0, the address "4" is assigned to the memory module 1, the address 8 is assigned to the memory module 2, and so forth.

FIGS. 13 and 14 of the accompanying drawings show address assignment to memory modules according to a second skewing scheme shown in FIG. 6 of U.S. Pat. No. 4,918,600.

According to this skewing scheme, the memory modules to be assigned with the addresses are shifted one by one every time the number of addresses which corresponds to a multiple (e.g. 8) of the number of memory modules (i.e., 4) have been assigned. In this case, relation among the memory module ID number MM#, the address ADR and the number N of the modules is given by the following expression (2):

$$MM\# = (ADR + ADR \div (N \times 2)) \bmod N \quad (2)$$

Thus, according to this scheme, the address assignment is made in such a manner that the address "0" is assigned to the memory module 0, the address 8 is assigned to the memory module 1, the address 16 is assigned to the memory module 2, and so forth.

FIG. 15 shows a relation between the inter-address distance or the access stride and the performance in the case where the first skewing scheme defined by the expression (1) or shown in FIG. 11 is adopted, while FIG. 16 shows the relation between the stride and the access performance in the case where the second skewing scheme defined by the expression (2) or shown in FIGS. 13 and 14 is adopted, both on the assumption that the number of memory modules is four in the system configuration shown in FIG. 10. Further, FIG. 17 shows relation between the stride and the performance in the case where the first skewing scheme defined by the expression (1) or shown in FIG. 12 is adopted on the assumption that the number of the memory modules is eight in the system shown in FIG. 10. In this conjunction, it should be noted that the access performance of concern is determined after lapse of sufficient time from a time point the processor 500 started to issue the access requests and in the state where the number of access requests processed by the memory during one cycle has become steady. Further, it is to be added that the performance capable of processing one element in one cycle is represented by "1" (unity).

As can be seen from the comparison of FIG. 9 with FIGS. 15 and 16, the variety of the strides which give rise to degradation in the performance can be decreased by adopting the first skewing scheme given by the expression (1) or illustrated in FIG. 11. This effect becomes more significant when the second skewing scheme defined by the expression (2) or illustrated in FIGS. 13 and 14 is adopted.

It must be pointed out that the vector processor disclosed in U.S. Pat. No. 4,918,600 is designed to issue sequentially the access requests at a rate of one access request in one cycle. However, there already exists such a vector processor which is so designed as to be capable of processing simultaneously a plurality of elements belonging to a same vector data in response to a single instruction in order to enhance the processing capability of the vector processor. For convenience of description, the simultaneous processing of plural elements as mentioned above is referred to as the element parallel processing, while the number of elements susceptible to the simultaneous processing will be referred to as the element parallelism factor. Further, the vector processing other than the element parallel processing will hereinafter be referred to as the sequential processing. Now, description will turn to a hitherto known vector processor designed for executing the element parallel processing. FIG. 18 shows a vector processor of which element parallelism factor is four and which is disclosed in JP-A-63-66661.

In the figure, a reference numeral 14 denotes a vector register unit which includes four vector data controllers 14-0, 14-1, 14-2 and 14-3 and vector registers (not shown).

Further, reference numeral 15 denotes a requester module which issues access requests to a main storage 13. As can be seen, the requester module 15 is comprised of four access request control units 1 to 4 which are connected to vector data controllers 14-0 to 14-3, respectively.

In FIG. 18, reference numerals 5 to 8 denote, respectively, access request buffers for holding temporarily the access requests issued by the access request control units.

Finally, reference numerals 9 to 12 denote access request priority determining units for determining the priority with which the access requests in conflict are to be processed.

The main storage 13 includes memory modules MM0, MM1, MM2 and MM3 which are affixed with ID numbers "0", "1", "2" and "3", respectively. The addresses in the memory modules MM0, MM1, MM2 and MM3 are so assigned that a single continuous memory space can be implemented for all of the four memory modules.

Next, description will turn to a flow along which the access requests are processed.

At first, access request control units 1, 2, 3 and 4 issue access requests in parallel to the associated access request buffer units 5, 6, 7 and 8 is unoccupied or idle, respectively. However, in case none of the access request buffers 5-2 of the access request buffer units 5, 6, 7 and 8, the access request control units 1, 2, 3 and 4 issue no buffer requests.

In the access request buffer unit 5, the address signal accompanying the access request is decoded by an address decoder unit 5-1, whereby the ID number of the memory module to be accessed is determined. The access request priority determining unit 9, 10, 11 or 12 corresponding to the memory module as determined is then selected and the corresponding information is sent to an access request send-out control unit 5-3 incorporated in the access request buffer unit 5 with the access request being transferred to the access request buffer 5-2.

When the access requests are present in the access request buffer 5-2, an access request send-out control unit 5-3 selects the access request, beginning with the oldest one, and sends the access request thus selected to the access request priority determining units 9, 10, 11 or 12 which corresponds to the memory module as designated by the selected access request.

Other access request send-out control units 6-3, 7-3 and 8-3 perform the similar processing.

In the access request priority determining unit 9, an access request priority determining circuit 9-1 determines the processing priority to be imparted to the access requests supplied from the individual access request buffer units 5, 6, 7 and 8.

An access request accept controller 9-2 accepts the access request of the highest priority and sends out an access request accept acknowledge signal to the access request buffer units 5, 6, 7 or 8 in which the received access request as accepted origins.

The other access request priority determining units 10, 11 and 12 perform the similar processing.

The access request send-out control unit 5-3 incorporated in each of the access request buffer units 5, 6, 7 and 8 responds to reception of the access request accept acknowledge signal by sending out a succeeding access request to the corresponding one of the access request priority determining units 9, 10, 11 and 12.

The access request priority determining unit 9 in turn responds to reception of the access request issued from one of the access request buffer units 5, 6, 7 and 8 by sending out that access request-to the memory module MM0.

Each of the other access request priority determining units 10, 11 and 12 performs the similar processing.

In this manner, the four vector elements can be processed in parallel.

SUMMARY OF THE INVENTION

In the prior art vector processor shown in FIG. 18, there arises a problem that the stride giving rise to the performance degradation differs among the memory systems which differ from one another in respect to the element parallelism factor, i.e., the number of memory modules. In many of the vector processors in which the element parallel processing is adopted, the element parallelism factor is varied in dependence on models or types of the vector processors which belong to a same machine or product series in an attempt to ensure satisfactory performance for a wide range of applications. Further, in many cases, the number of the memory modules is also varied in order to increase the memory throughput in conformance with the performance of the vector processor. In other words, the element parallelism factor and the number of memory modules differ from one to another model. Accordingly, when the stride providing a cause for degrading the performance differs in dependence on the element parallelism factor and the number of memory modules, there may arise such situation that a program tuned to a certain model of machine by a user can not ensure the performance of the tuned program when it is used in the machine of another model. It goes without saying that these machines are difficult to use, unfavorably to the user.

In the light of the state of the art described above, it is therefore an object of the present invention to provide a vector processor which belongs to a class of a system which is made up of a plurality of vector processors which differ in respect to the element parallelism factor and the number of memory modules and which vector processor can evade the shortcomings of the prior art vector processor mentioned above.

In view of the above and other objects which will become apparent as description proceeds, there is provided according to an aspect of the present invention a vector processor for a system or machine to which vector processors having memory systems differing in respect to the element parallelism factor belong, wherein the vector processor includes address generating circuits in a number corresponding to that of the individual memory modules and a circuit for selecting address generating circuits to be used in dependence on the element parallelism factor. The period (m) at which the addresses generated by the address generating circuits are assigned to the memory modules is skewed or shifted is determined to be equal to a given value determined in common to a plurality of machine models belonging to the system series and preferably equalized to the period in the vector processor having a maximum value of the element parallelism factor in the system series. More preferably, buffers corresponding to access request stack units (queues) are provided in a stage preceding the access request priority determining unit, wherein the states of the buffers provided in precedence to the access request priority determining unit are stored in an access request send-out control unit incorporated in the access request buffer to thereby control the sending of the access requests from the access request buffers so that the access requests issued from one and the same access request control unit may get ahead one another.

The invention will become more readily apparent form the following description of preferred embodiments thereof shown, by way of example only, in the drawings.

BRIEF DESCRIPTION OF THE DRAWINGS

FIG. 8 is a view showing addresses assigned by an interleave method known heretofore;

FIG. 9 is a view for illustrating relations between address incrementation values and access request processing performance in the case where address assignment is performed in accordance with the interleaving scheme of FIG. 8 in a vector processor known heretofore;

FIG. 11 is a view illustrating, by way of example, addresses assigned to four memory modules in accordance with a first skewing scheme known heretofore;

FIG. 12 is a view illustrating, by way of example, addresses assigned to eight memory modules in accordance with a first skewing scheme known heretofore;

FIG. 13 is a view illustrating a portion of addresses assigned to four memory modules in accordance with a second skewing scheme known heretofore;

FIG. 14 is a view illustrating the other portion of addresses assigned to four memory modules in accordance with a second skewing scheme known heretofore;

FIG. 15 is a view showing relations between stride values and access request processing performance in the case where a first skewing scheme shown in FIG. 11 is adopted on the assumption that the number of memory modules is four in the known vector processor shown in FIG. 10;

FIG. 16 is a view showing relations between stride values and access request processing performance in the case where a second skewing scheme shown in FIGS. 13 and 14 is adopted on the assumption that the number of memory modules is four in the known vector processor shown in FIG. 10;

FIG. 17 is a view showing relations between stride values and access request processing performance in the case where a first skewing scheme shown in FIG. 12 is adopted on the assumption that the number of memory modules is eight in the known vector processor shown in FIG. 10;

FIG. 19 is a view illustrating relations between strides and access request processing performance when a second skewing scheme shown in FIGS. 13 and 14 is employed in the conventional element parallel processing type vector processor shown in FIG. 18;

FIG. 20 is a view showing addresses of access requests issued over different machine cycles when the stride is seven in the conventional element parallel processing type vector processor shown in FIG. 18; and FIG. 21 is a view for illustrating states of access request processings in the conventional element parallel processing type vector processor shown in FIG. 18.

DESCRIPTION OF THE PREFERRED EMBODIMENTS

Before entering into detailed description of a preferred or exemplary embodiment of the invention, the problems of the prior art vector processors will once again be discussed below in detail.

As pointed out previously, the element-parallel type vector processor suffers a problem that the stride, which may incur degradation in performance, differs in dependence on the element parallelism factors, which may differ from one another. This problem will further be examined.

In the prior art vector processor described in JP-A-63-66661 mentioned previously, there is adopted a skewing scheme which is substantially equivalent to the first skewing scheme defined by the expression (1) or shown in FIG. 11. Analysis of relation between the stride and the performance in the system adopting this first skewing scheme shows the same result as that shown in FIG. 15. On the other hand, the performance achieved with the interleave-type address assignment without resorting to the skewing scheme is same as that illustrated in FIG. 9. In this case, the element parallelism factor and the number of memory modules are both "4", respectively.

In the aforementioned vector processor known heretofore, the relation between the stride and the performance, as realized by resorting to the first skewing scheme defined by the expression (1) or illustrated in FIG. 12, is same as that shown in FIG. 17 in the case where both the element parallelism factor and the number of memory modules are "8", respectively.

As can be seen from comparison of the result shown in FIG. 15 with that of FIG. 17, the performance undergoes degradation at the strides "8", "24" and others in the case of the example shown in FIG. 17, whereas no degradation in the performance occurs at the strides of "8" and "24" in the case of the example shown in FIG. 17. Such degradation in performance can be prevented by adopting the second skewing scheme given by the expression (2). In this case, however, the performance degradation occurs at other strides, as can be seen from the stride/performance relation illustrated in FIG. 19, even through the performance degradation at the strides of "8", "24" and others can certainly be obviated.

Figure 18:
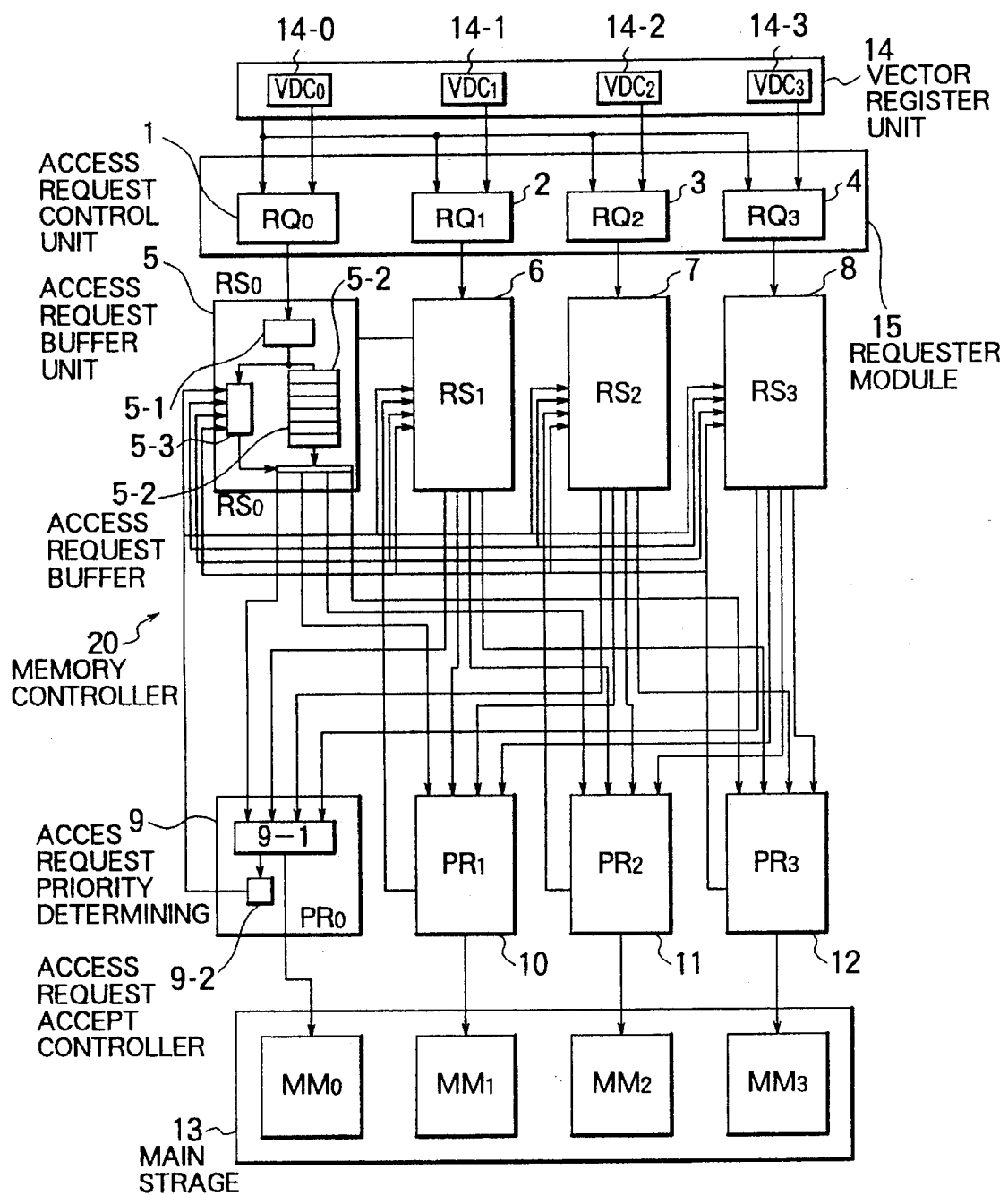
FIG. 18 is a block diagram showing a structure of an element parallel processing type vector processor known heretofore.

Furthermore, comparison of the relation shown in FIG. 15 with that of FIG. 19 shows that in the element-parallel type vector processor shown in FIG. 18, adoption of the second skewing scheme given by the expression (2) or illustrated in FIGS. 13 and 14 results in obviation of the performance degradation at the strides of "8", "24" and others when compared with the case where the first skewing scheme given by the expression (1) or shown in FIG. 11 is adopted. However, in the former case, the performance becomes poor at the strides of "3", "5", "7", "9" and others, which means that the second skewing scheme also suffers a problem that there exist a greater number of strides at which the performance of the vector processor undergoes degradation as compared with the case shown in FIG. 17.

The problem mentioned above can be explained by the fact that during the period in which the access requests held in the access request buffer unit 5 partake in the priority allocation executed by the access request priority determining unit 9, the access requests tend to be resident at outlets of the access request buffer units 5 to 8. As a consequence, when the access request which lost in the competition for gaining the priority is placed in queue, the access request succeeding to the queued access request is prohibited from partaking in the competition for priority allocation executed by the access request priority determining unit 9.

This will be explained on the assumption that the stride is "7", by way of example.

FIG. 20 shows addresses of access requests which are issued by the access request control units 1 (RQ0), 2 (RQ1), 3 (RQ2) and 4 (RQ3) in each machine cycle with the access stride of "7".

The addresses "0", "7", "14" and "21" issued in the first machine cycle are assigned to the memory modules MM0, MM3, MM3 and MM3, as can be seen in FIG. 13. Accordingly, these access requests are destined to be sent out to the access request priority determining units 9, 12, 12 and 12, respectively.

Because the access requests for the addresses "0" and "7" make it necessary to access the mutually different memory modules MM0 and MM3, these access requests can instantly be accepted by the access request priority determining units 9 and 12, respectively. On the other hand, the access requests for the addresses "14" and "21" require the access to the memory module MM3 as with the case of the access request for the address "7". Accordingly, the access requests for the addresses "14" and "21" are not accepted but held in the access request buffers 5-2 of the access request buffer units 7 and 8, respectively.

In a succeeding machine cycle, access requests for the addresses "28", "35", "42" and "49" are issued by the access request control units 1, 2, 3 and 4, respectively. It will be noted that all of these addresses belong to the memory module MM3. Since the access requests for the addresses "28" and "35" are allocated to the memory module MM3, they are sent out to the access request priority determining unit 12 after the processing of the access requests for the addresses "14" and "21". In contrast, the access requests for the addresses "42" and "49" are caused to be queued in succession to the preceding access requests for the addresses "14" and "21" which are held in the access request buffers 5-2 of the access request buffer units 7 and 8, respectively, and continue to be held in the access request buffers 5-2 until the access requests for the addresses "14" and "21" are sent out to the access request priority determining unit 12 from the access request buffer units 7 and 8, respectively.

In the next machine cycle, access requests for the addresses "56", "63", "70" and "77" are sent out from the access request control units 1, 2, 3 and 4, respectively. It will be noted that these addresses belong to the memory modules MM3, MM2, MM2 and MM2, respectively. Of these addresses, the address "63" belongs to the memory module MM2. However, the access request for this address "63" is forced to remain to be processed so long as the preceding access request for the address "35" of the memory module MM3 is resident in the access request buffer 5-2 incorporated in the access request buffer unit 6.

In this manner, the access requests are forced to stay in the access request buffer units 5, 6, 7 and/or 8, which eventually leads to such situation in which issuing of the access requests from the access request control units 1, 2, 3 and/or 4 are stopped.

FIG. 21 shows the individual machine cycles and the states in these cycles.

In FIG. 21, symbols "PR0", "PR1", "PR2" and, "PR3" represent the access request priority determining units 9, 10, 11 and 12, respectively. On the other hand, symbols "RQ0", "RQ1", "RQ2" and "RQ3" represent the access request control units 1, 2, 3 and 4, respectively. Further, a symbol "." represents timings at which the access requests are sent to the access request priority determining units 9, 10, 11 and 12. On the other hand, blank circles "o" represent timings at which the access requests are sent to the memory modules MM0, MM1, MM2 and MM3. Further, segments interconnecting the symbols "." and "o" represent that the access requests are not selected by any one of the access request priority determining units 9, 10, 11 and 12 but placed in the waiting or queue state. Finally, the numbers of the processed access requests represent the number of access requests processed in each of the machine cycles.

As can be seen from FIG. 21, the number of the access requests which can be processed during one machine cycle is one or two at the most, which is a half or less than the number of requests (i.e., 4) capable of being processed with a peak performance.

Now, description will turn to a vector register according to an embodiment of the invention in which the problems elucidated above can successfully be overcome.

Figure 1:
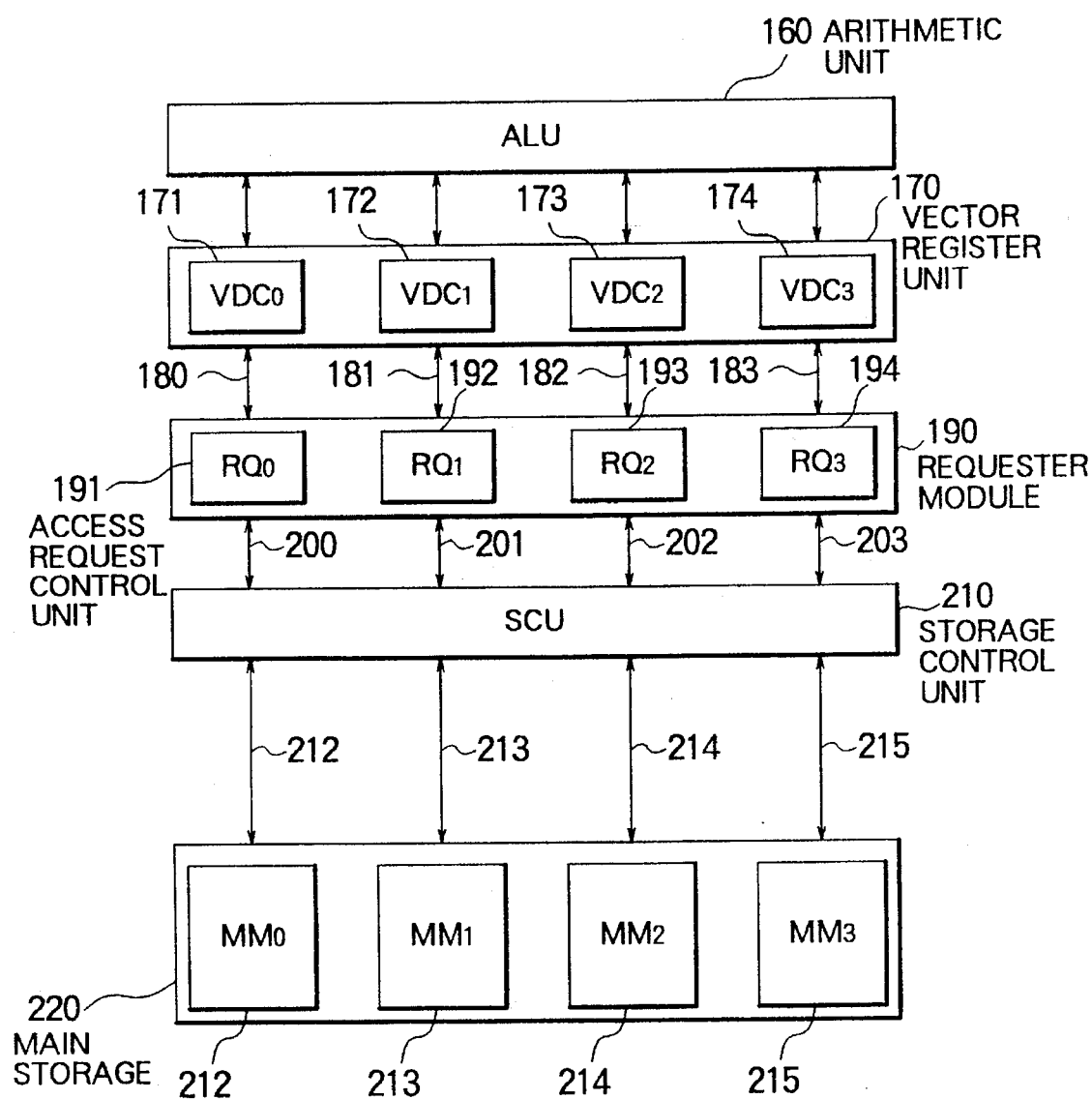
FIG. 1 shows generally a major arrangement of an element parallel type vector processor according to an embodiment of the present invention.

FIG. 1 shows generally a major portion of vector processor having the element parallelism factor of "4" according to an embodiment of the invention. The vector processor of the instant embodiment belongs to a product or system series which includes two types of machine models having the element parallelism factors of "4" and "8", respectively.

Referring to FIG. 1, the vector processor includes an arithmetic unit (ALU) 160, a vector register unit (VRU) 170 including a plurality of vector registers (not shown), a requester module (RM) 190, a storage control unit (SCU) 210 and a main storage (HS) 220.

With the vector processor according to the instant embodiment, a variety of instructions can be executed which may include, for example, a load instruction for loading vector data from the main storage 220 in a given one of the vector registers, a store instruction for storing vector data in the main storage 220 from a given one of the vector registers, arithmetic instructions for reading out vector data held in a given one of the vector registers, executing arithmetic operation on the vector data by the arithmetic unit 160 and storing vector data resulting from the arithmetic operation in another one of the vector registers and others. However, for the purpose of simplification of description, only those components which concern the store instruction are shown with the circuitries for the other instructions being omitted from illustration.

The vector data to be stored are supplied from the vector register unit 170 with the data being divided into a plurality of groups each including vector elements in a number equal to the element parallelism factor. Hereinafter, these element groups will be referred to as the parallel element groups. The vector elements belonging to one and the same parallel element group are supplied from the vector register unit 170 in parallel with one another.

The vector register unit 170 includes four vector data controllers (VDC0 to VDC3) 171, 172, 173 and 174. Similarly, the requester module 190 is comprised of four access request control units 191, 192, 193 and 194.

The vector data controllers 171, 172, 173 and 174 respond to a same store instruction to issue an access request for storing the vector data designated by that store instruction to the main storage 220. The access request is sent to the requester module 190 via a bus 180, 181, 182 or 183. The vector register unit 170 includes a plurality of vector registers (now shown), wherein vector data to be stored in the main storage 220 in response to the store instruction is read out from a given one of the vector registers on a four-by-four element basis. Since data read-out from these vector processors as well as data write operation is well known in the art, any further elucidation will be unnecessary.

The access requests are supplied sequentially to an associated one of the access request control units (RQ0, RQ1, RQ2 or RQ3) 191, 192, 193 or 194.

Figure 2:
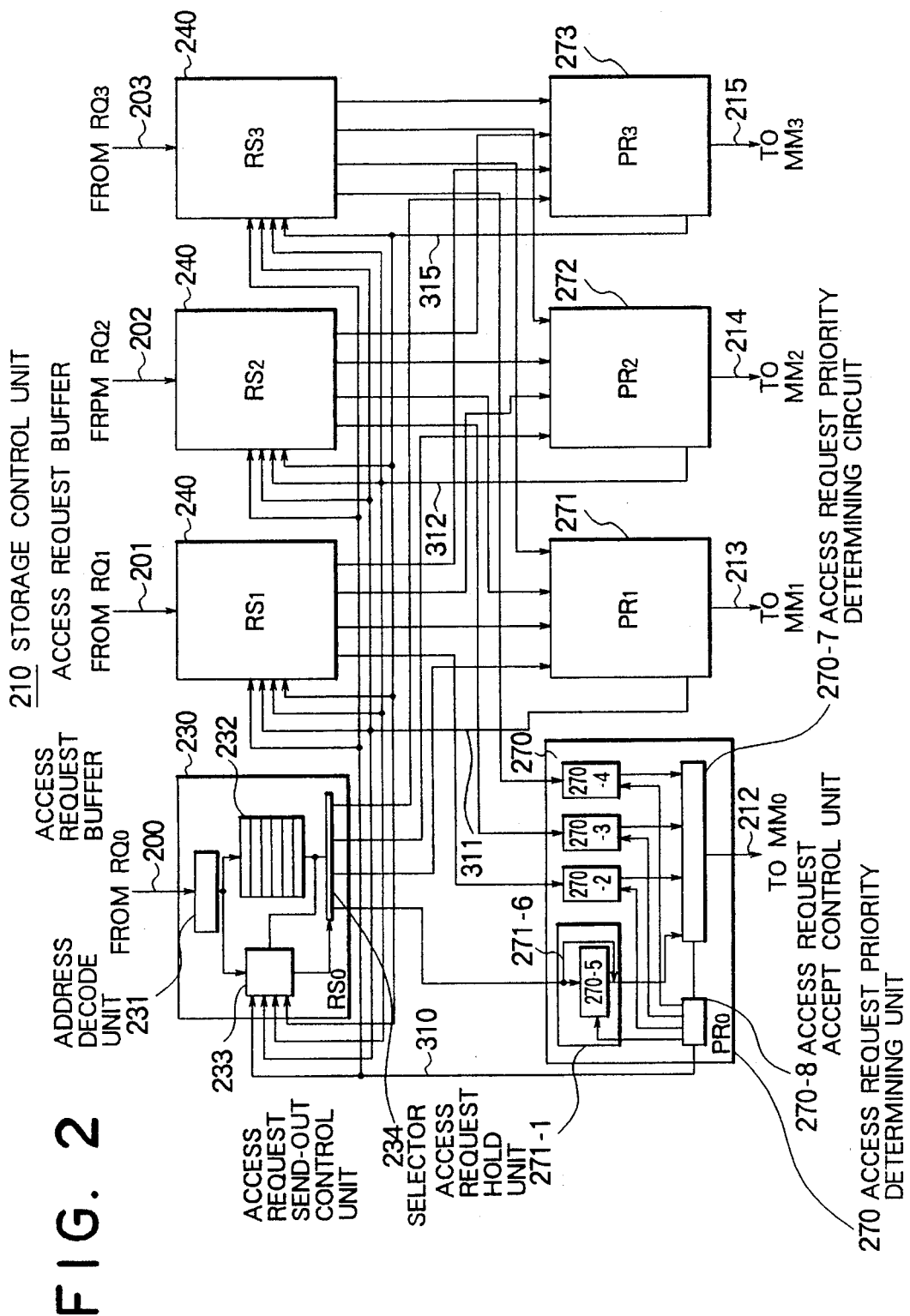
FIG. 2 is a block diagram showing a circuit configuration of a storage control unit employed in the vector processor shown in FIG. 1.

Referring to FIG. 2, the storage control unit 210 is comprised of four access request buffer units 230, 240, 250 and 260 and four access request priority determining units 270, 271, 272 and 273.

The access request buffer unit 230 is comprised of an address decode unit 231, an access request buffer 232 and an access request send-out control unit 233.

The address decode unit 231 incorporated in the access request buffer unit 230 serves to convert the address accompanying the access request into an address containing a memory module ID number and an intra-module address of the memory module to be accessed.

Figure 3:
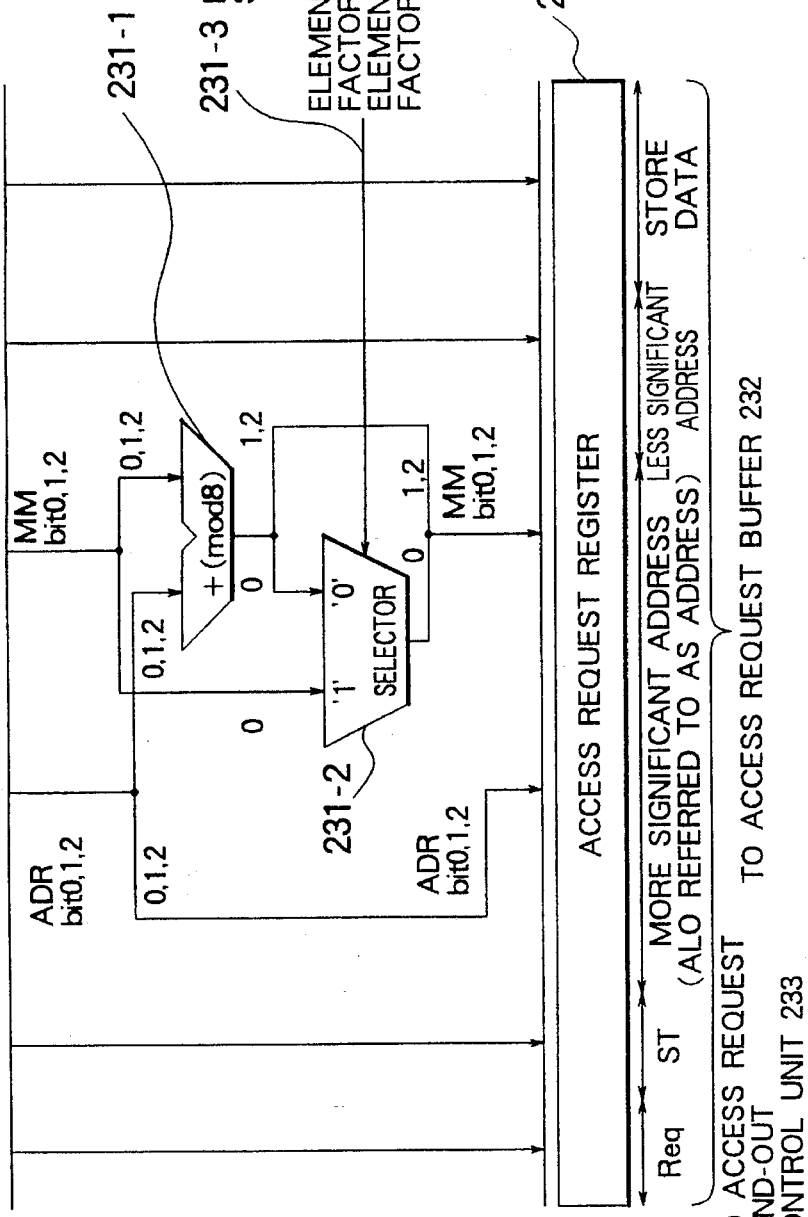
FIG. 3 is a circuit diagram showing in detail a configuration of an address decoder unit employed in the storage control unit shown in FIG. 2.

FIG. 3 is a block diagram showing in detail a configuration of the address decode unit 231. As can be seen in the figure, the address decode unit 231 includes a 3-bit adder 231-1 for modulo-8 operation, a selector 231-2, a path 231-3 for inputting to the selector 231-2 a machine model signal set previously in accordance with the element parallelism factor, and access request registers 231-4 and 231-5. There is set or placed in the access request register 231-4 an access request supplied from a corresponding one of the access request control units 191, 192, 193 and 194.

The adder 231-1 operates to add the address bits ADRbit0, ADRbit1 and ADRbit2 to the memory module ID number bits MMbit0, MMbit1 and MMbit2 by modulo-8 addition, whereon memory module ID number bits MMbit1 and MMbit2 are newly created by the first and second bits resulting from the above addition.

Inputted to the selector 231-2 are the bit MMbit0 of the access request register 231-4 and the zeroth bit outputted from the adder 231-1 together with the machine model signal 231-3 inputted as a select enable signal. When the machine model signal 231-3 is "0", i.e., when the element parallelism factor is "4", the bit MMbit0 of the access request register 231-4 is selected. On the other hand, when the machine model signal 231-3 is "1", indicating that the element parallelism factor is "8", the zeroth bit of the output of the adder 231-1 is selected to thereby generate a new memory module ID bit MMbit0.

As is apparent from the above, when the element parallelism factor is "8", all the MMbit0, MMbit1 and MMbit2 are used as the bits representing the new memory module ID numbers, while when the element parallelism factor is "4", only the bit MMbit1 and MMbit2 are used.

At this juncture, it should be mentioned that the stride which gives rise to occurrence of performance degradation is smaller when the element parallelism factor is "8" as compared with that in the case where the element parallelism factor is "4". Accordingly, in the description which follows, consideration will be paid to the performance degradation in the case where the element parallelism factor is "8" while taking into account the performance degradation incurred when the stride is "4".

Equalization of the performance degrading strides for the different element parallelism factors can be achieved by equalizing the periods at which the address assignment is skipped or skewed in both the cases. More specifically, the period or periodicity for the address assignment in the case where the element parallelism factor is "4" is made equal to the periodicity of the address assignment in the case where the element parallelism factor is "8". In this conjunction, it is noted that the periodicity with which the address assignment is skewed or skipped for the element parallelism factor of "8" can be given by "8". Accordingly, the periodicity with which the address assignment is skewed for the element parallelism factor of "4" is made equal to "8".

For the element parallelism factor of "8", the address bits ADRbit0, ADRbit1 and ADRbit2 which are more significant than the memory module bits MMbit0, MMbit1 and MMbit2 by three bits (i.e., which corresponds to the bits MMbit0, MMbit1 and MMbit2 multiplied by eight) is added to the bits MMbit0, MMbit1 and MMbit2, which is then followed by the modulo-8 operation. This means that the bits MMbit0, Mmbit1 and MMbit2 is incremented by one every time the address advances by eight. Thus, the address assignment to the module can be skewed or shifted at a rate of once per eight elements.

On the other hand, when the element parallelism factor is "4", the bits ADRbit1 and ADRbit2 are added to the bits MMbit1 and MMbit2, which is then followed by modulo-4 operation. This means that "1" is added to the bits MMbit1 and MMbit2 every time the address advances by "8". In this way, the address assignment to the memory modules can equally be skewed at a rate of once per eight elements.

In brief, with this circuit, the memory module ID number is determined by replacing the expression (1) by the following one:

$$MM\# = (ADR + ARR \div m) \bmod N \qquad (3)$$

where m represents a predetermined constant period which does not depend on the machine model, and N represents the number of memory modules of the vector processor under consideration. According to the teachings of the invention incarnated in the instant embodiment, the period $\underline{m}$ is determined to be equal to the periodicity in a machine model equipped with a maximum number of memory modules in the vector processor series to which the vector processors of the model under consideration belong. Thus, in the case of the vector processor series to which the instant embodiment of the invention is directed, the periodicity of concern is equal to the maximum number of the memory modules which is "8". It should however be mentioned that the periodicity for the machine model incorporating a maximum number of memory modules may also be so selected as to be given by an integral multiple of the number of memory modules (e.g. twice as large as the number of memory modules or "16"), as is apparent from the expression (2).

In this manner, the address translation or conversion is carried out, whereby an access request containing a new address obtained as the result of the address translation is set in the register 231-5 with the access request REQ being sent to the access request buffer 232.

Assignment of the addresses generated by this circuit to the memory modules for the cases where the numbers of the memory modules are "4" and "8" are same as described hereinbefore by reference to FIGS. 13 and 14 and FIG. 12. Namely, the periods at which the address assignment to the memory modules are skewed are uniformized to be "8".

The access request containing the address as generated is sent out from this register 231-5 to the access request buffer 232. At the same time, the signal REQ contained in this access request is sent to the access request send-out control unit 233.

The access request buffer 232 shown in FIG. 2 informs the access request send-out control unit 233 of the destination memory module ID number to which the oldest one of the access requests held in the access request buffer 232 is to be sent. The access request send-out control unit 233 makes decision as to whether or not this access request may be sent out. If this decision results in affirmation (YES), the ID number of the destination access request priority decision unit such as the unit 270 is sent to the selector 234. In response, the selector 234 transfers this access request to the access request priority determining unit such as the unit 270. However, when a send-out inhibit signal is issued from the access request send-out control unit 233, this transfer is not carried out. Further, when the selector 234 sent out this access request to any one of the access request priority determining units, e.g. the unit 270, the access request buffer 232 sends the access request send-out signal to the access request send-out control unit 233. The processing performed by the access request send-out control unit 233 will be described later On.

The access request priority determining unit 270 includes access request hold units 270-1, 270-2, 270-3 and 270-4 which correspond to the access request buffer units 230, 240, 250 and 260, respectively, an access request priority determining circuit 270-7 and an access request accept controller 270-8. The access request hold unit 270-1 is composed of an access request queue 270-5 and a through-path 270-6.

The number of stages of the access request queue 270-5 of the access request hold unit 270-1 is given by an integer greater than S which does not exceed the result of calculation given by:

$$m \div N - m \div (N \times N)$$

where N represents the element parallelism factor or the number of memory modules and m represents the address skewing periodicity.

Assuming, by way of example, that the element parallelism factor N=4 with m being equal to "8", then S=1 because m÷N−m÷(N×N) =8÷4−8÷(4×4)=1.5. Accordingly, the number of stage of the access request queue 270-5 may be selected to be "1" or more. Since the element parallelism factor is "4" and "8" while the address skewing periodicity is "8", S=1 when N=4 with m=8, while S=0 when N=8 with m=8. Accordingly, the number of stages of the access request queue 270-5 is selected to be one for satisfying both of the cases mentioned above.

The access request hold unit 270-1, 270-2, 270-3 or 270-4 incorporated in the access request priority determining unit 270 responds to the access request sent from the corresponding one of the access request buffer units 230, 240, 250 or 260 to thereby hold the access request in the access request queue 270-5. At the same time, the access request as received is transferred to the access request priority determining circuit 270-7 via the through-path 270-6.

In the foregoing, it has been assumed that the access request queue 270-5 is implemented in one stage. However, when the access request queue 270-5 is realized with a plurality of stages and if any stage is found "unoccupied or empty", then a further access request may be accepted and placed at the trailing end of the access request queue 270-5 with the leading access request of the queue 270-5 being transmitted to the access request priority determining circuit 270-7.

In the access request priority determining circuit 270-7, the access requests are to be processed are selected in accordance with a predetermined priority scheme from those held in the individual access request hold units 270-1, 270-2, 270-3 and 270-4, whereon the access request as selected is sent to the memory module MM0 via a port 212.

The access request accept control circuit 270-8 responds to reception of the access request by sending an access request sending completion signal to one of the access request hold units 270-1, 270-2, 270-3 or 270-4 which sent out the access request to the memory module MM0.

Upon reception of the access request sending completion signal, the access request hold units 270-1, 270-2, 270-3 or 270-4 sets the access request queue 270-5 incorporated therein to the state "unoccupied or empty".

The access request accept control circuit 270-8 sends an access request accept acknowledge signal 310 to the access request buffer units 230, 240, 250 and 260, respectively. The access request accept acknowledge signal 310 contains an ID number of the access request buffer unit (e.g. the unit 230) whose access request has been received and an ID number of the access request priority determining unit (e.g. 270) to which the access request reception control circuit 270-8 belongs. Although the access request queue 270-5 is implemented in a single stage in the case of the instant embodiment, the access request priority determining circuit 270-5 may be realized with a plurality of stage. In that case, the states of the stages of the access request queue may be shifted one-by-one in the direction toward the leading stage so that the trailing stage may be set to the state "empty".

Figure 4:
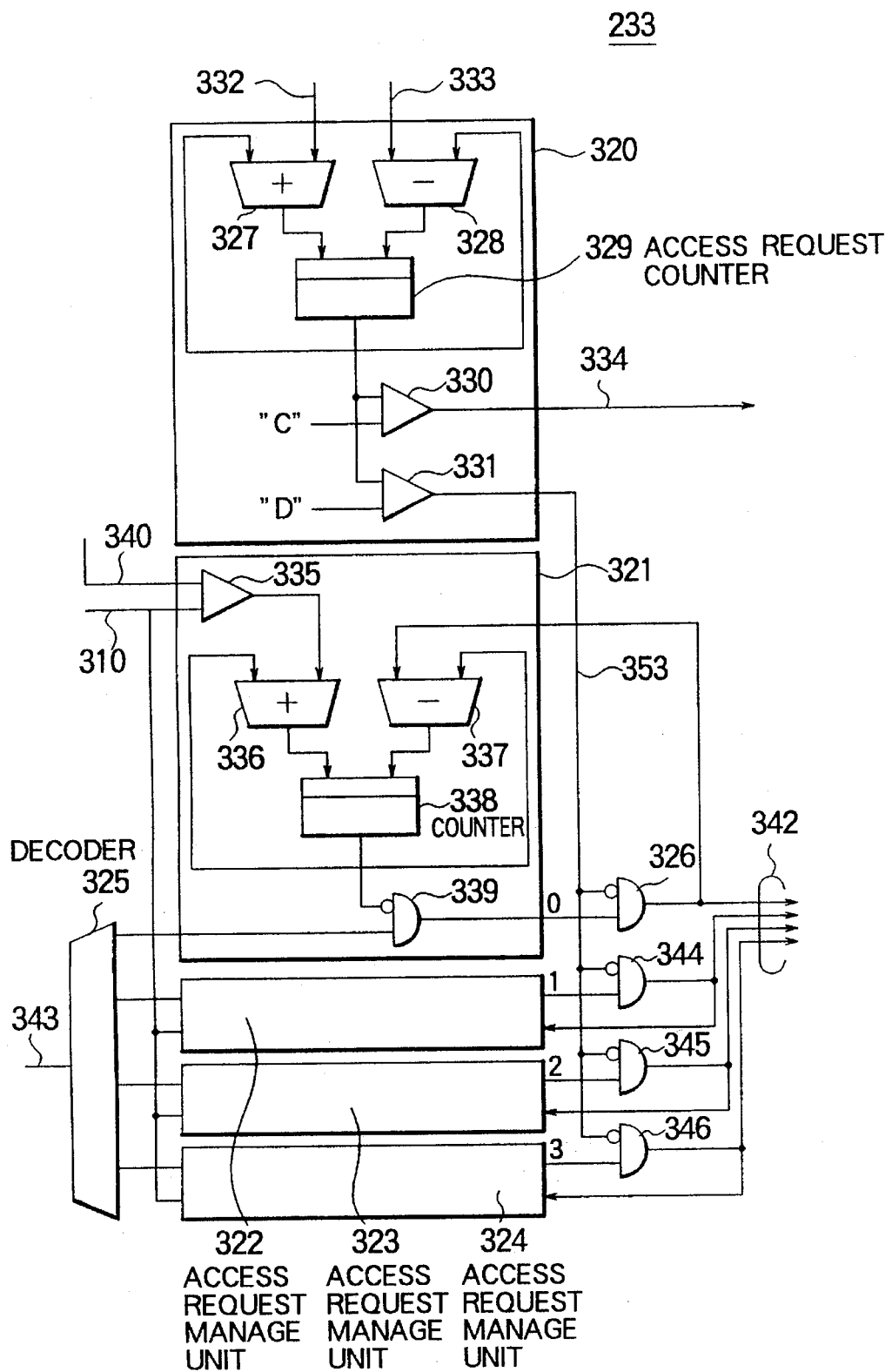
FIG. 4 is a circuit diagram showing a configuration of an access request send-out control unit employed in the vector processor shown in FIG. 1.

Now, referring to FIG. 4, a flow of processings executed by the access request send-out control unit 233 will be explained.

The access request send-out control unit 233 includes an access request buffer manage unit 320 and four access request queue control units 321, 322, 323 and 324 which correspond to the access request priority determining units 270, 271, 272 and 273 (FIG. 2), respectively. The access request manage unit 321, by way of example, is so arranged as to inhibit any succeeding access request from being sent to the selector 234, unless the value of a counter 338 which serves to count the number of the access requests sent out from the access request buffer 232 to the corresponding access request priority determining unit (e.g. 270) and remaining unaccepted yet is zero. The counter 338 is initially set to zero. An ID number 343 of the send destination memory module indicated by the oldest access request supplied from the access request buffer 232 is decoded by a decoder 325, whereby logic "1" signal is sent to an AND gate incorporated in the access request manage unit 321 corresponding to the memory module ID number mentioned above. Parenthetically, in the state where the selector 234 (FIG. 2) does not send the access request yet, the input to the gate is "0". Accordingly, in the state mentioned above, the output of the AND gate 339 is "1". By making use of this output of the AND gate 339, a signal indicating the sending of this access request is transmitted to the access request priority determining unit 270 via the selector 234 and an AND gate 326. Additionally, the counter 338 is also incremented by utilizing the outputs of the AND gate and an adder 337. The other access request queue control units 322, 323 and 324 are adapted to perform similar processings, and the outputs of these units are sent to the selector 234 (FIG. 2) via AND gates 344, 345 and 346, respectively.

Subsequently, the access request accept acknowledge signal 310 inputted from, for example, the access request priority determining unit 270 is sent to, for example, the access request manage unit 321 which corresponds to the access request priority determining unit 270. Then, the access request manage unit 321 compares the access request buffer unit ID number contained in the access request accept acknowledge signal 310 with that of the access request buffer unit of the access request manage unit 321 with the aid of a comparator 335. When the comparison results in coincidence, the content of an access request queue counter 338 is decremented by "1" by means of a decrementer 336.

In the access request buffer manage unit 320, when the access request signal REQ supplied from the address decode unit 231 (FIG. 2) is "1", the value of an access request counter 329 is incremented by "1" by means of an incrementer 327. The result of this operation is stored once again in the access request counter 329. On the other hand, when an access request send-out signal 333 from the access request manage unit 323 (FIG. 2) is "1", the value of the access request counter 329 is decremented by "1" by a decremeter 328. The result of this operation is also stored in the access request counter 329. In this way, the access request counter 329 counts the number of access requests which are currently being held in the access request manage unit 323. A comparator 330 compares capacity C of the access request buffer 232 (FIG. 2) with the value of the access request counter 329. When the comparison results in coincidence, the comparator 330 issues an access request send-out inhibit signal 334 to the corresponding or relevant access request control unit 191 (FIG. 1). On the other hand, the comparator 331 compares the value of the access request counter 329 with "0". Upon occurrence of coincidence, an access request control signal 342 is set to "0" via the AND gate 326 and then sent to the selector 234 (FIG. 2) to thereby prohibit the access request from being sent out from the access request buffer 232 (FIG. 2).

Next, circuit configuration and operation according to the instant embodiment will be elucidated in conjunction with a processing of access requests based on a store instruction.

First referring to FIG. 1, the vector data controllers (VDC0, VDC1, VDC2, VDC3) 171, 172, 173 and 174 of the vector register unit 170 send out in parallel the addresses of the leading elements of the vector data, i.e., the base addresses as the information of the vector store instruction and the stride as the initial value to the access request control units 191, 192, 193 and 194 incorporated in the requester module 190. Further, the vector data controllers 171, 172, 173 and 174 send out sets each comprised of the access request REQ, a signal ST indicating the access request REQ is a store request and store data (data to be stored) to the corresponding access request control units 191, 192, 193 and 194, respectively.

The access request control units 191, 192, 193 and 194 are previously assigned with the ID numbers "0", "1", "2" and "3", respectively. In general, the i-th access request control unit generates an address for storing the i-th vector element in each of the parallel element groups supplied from the vector register unit 170. The address thus generated is supplied to the storage control unit 210 together with the i-th vector element. The address ADDji of the i-th vector element in the j-th parallel element group supplied from the vector register unit 170 is given by the following expression (4).

$$ADDji = \text{base address} + (j \cdot N + i) \cdot S \cdot L \quad (4)$$

where N represents the element parallelism factor, S represents the slide, and L represents a data length of the individual element. In the case of the instant embodiment, it is assumed that both of N and L are "8", respectively.

Figure 5:
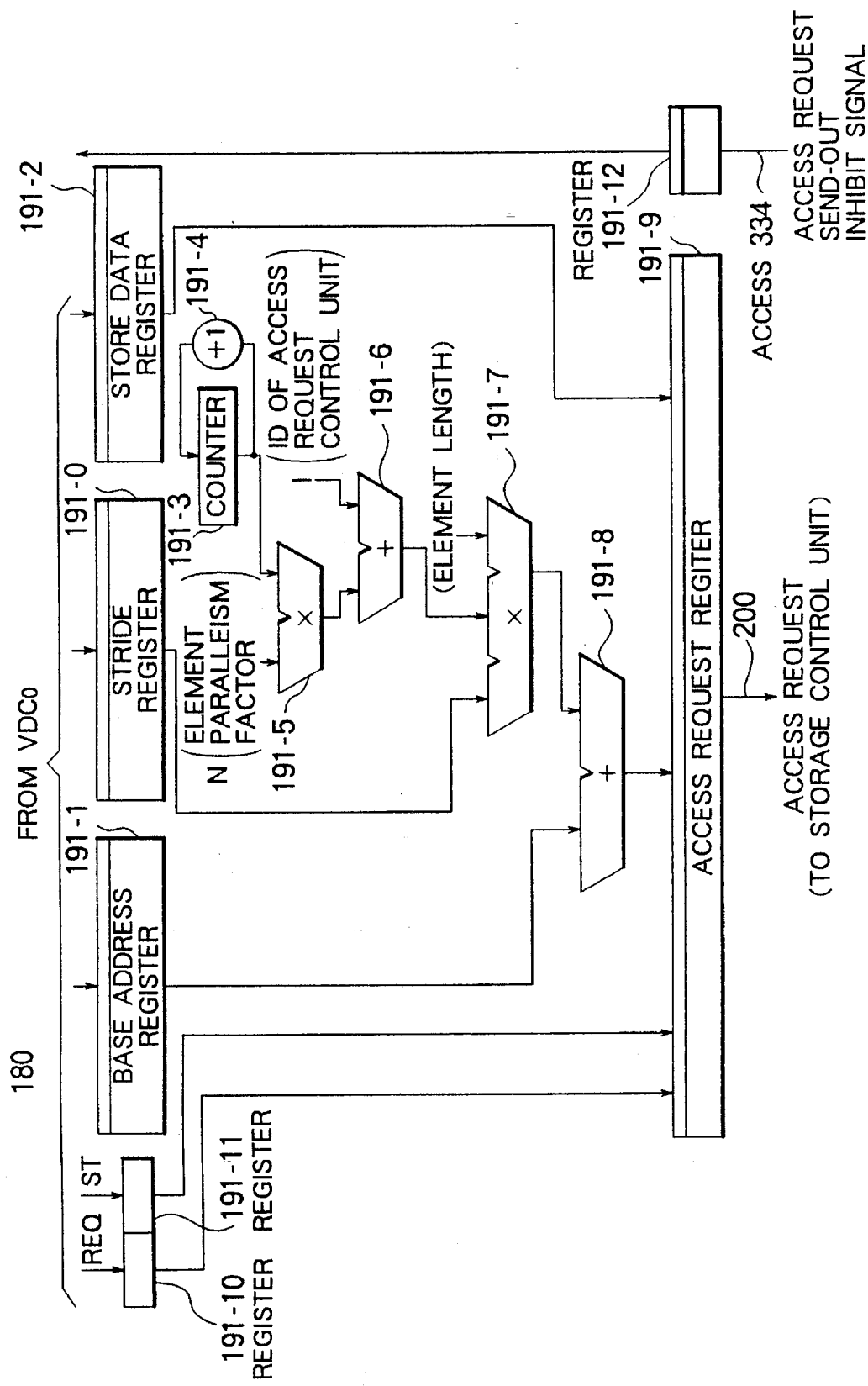
FIG. 5 is a block diagram showing a configuration of an access request control unit employed in the vector processor shown in FIG. 1.

FIG. 5 shows in a block diagram details of the access request control unit 191. As can be seen in the figure, the access request control unit 191 is comprised of registers 191-0, 191-1, 191-2, 191-10 and 191-11 for holding the base address, stride, store data, and the signals REQ and ST, respectively, a vector element counter 191-3, an incrementer 191-4, multipliers 191-5 and 191-7, adders 191-6 and 191-8, and an access request register 191-9. The other access request control units 192, 193 and 194 are equally implemented in the similar configuration.

Operations of the access request control units 191 to 194 will be described, by taking as example the operation of the access request control unit 191, being however understood that the description applies valid to the other access request control units 192, 193 and 194.

Referring to FIG. 5, in the access request control unit 191, the base address is held in the base address register 191-0 with the access stride being held in the stride register 191-1. Further, upon every reception of the set of the store data (i.e., the zero-th element in each parallel element group of the vector data to be stored), the access request REQ and the store request ST, these data are placed in the registers 191-2, 191-10 and 191-11, respectively. The i-th access request control unit calculates the address ADDji of the i-th element in the j-th parallel element group in accordance with the expression (4) in a manner which will be described below. The counter 191-3 serves for counting the number of access requests as generated in the access request control unit 191 up to a given time point. The initial value of this counter 191-3 is zero. The content of this counter 191-3 is incremented by one every time the access request REQ is issued. Accordingly, the content of this counter before being updated represents the ID number j of the parallel element group to which the store data received currently belongs. Thus, the desired address ADDji can be calculated in accordance with the previously mentioned expression (4) through cooperation of the multipliers 191-5, 191-7 and the adders 191-6, 191-8. This address ADDji is transferred to the access request register 191-9 together with the store data held in the store data register 191-2 and the signals REQ and ST held in the registers 191-10 and 191-11 to be combined with the latter for thereby generating an access request to be sent to the storage control unit.

At this juncture, it should be mentioned that each of the access request control units is so arranged as to respond to the access request send-out inhibit signal 334 as outputted from the storage control unit 210, as described latter on, for thereby sending the access request send-out inhibit signal 334 to the corresponding vector data controller, e.g. the vector data controller 171, whereby further transfer of the access request is prohibited.

Figure 6:
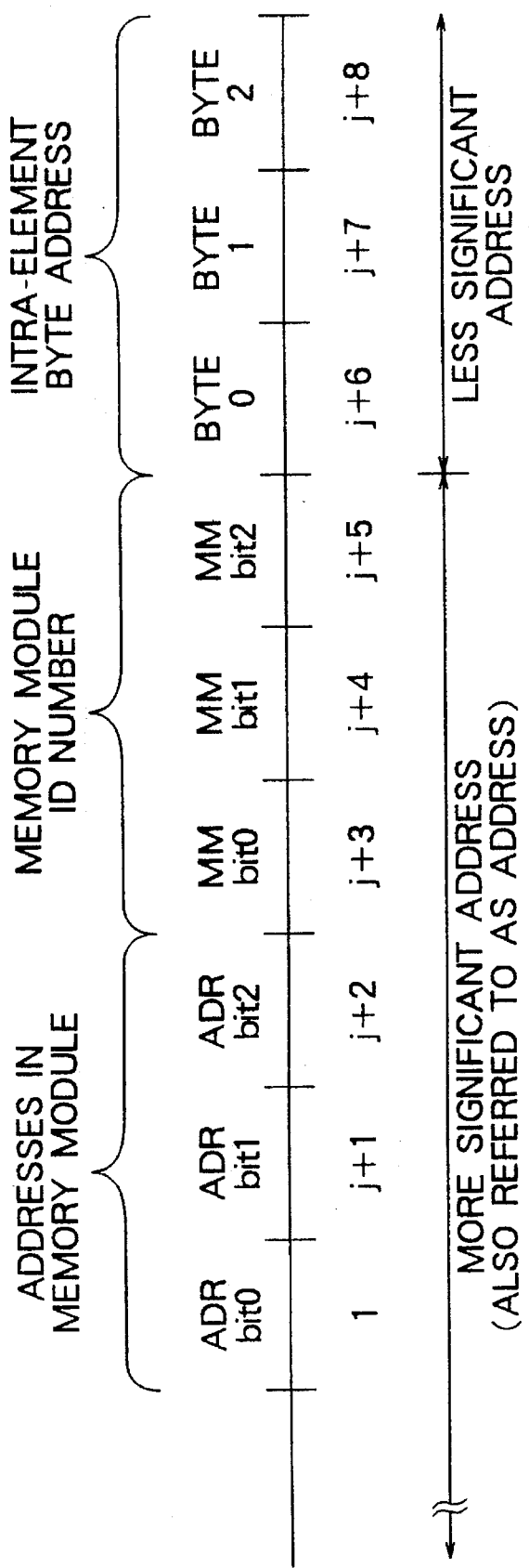
FIG. 6 is a view showing a format of an address signal supplied to the storage control unit shown in FIG. 2.

FIG. 6 shows a plurality of fields for the address generated in each of the access request control units 191, 192 193 and 194. Referring to the figure, the more significant address represents the address defined previously, i.e., the ID number allocated to the main storage on an access-by-access basis. This more significant address will also be referred to simply as the address in the description which follows. Further, the less significant address indicates a byte address in one element of the vector data. In the case of the instant embodiment, one vector element is assumed as having an eight-byte length. Accordingly, the less significant address includes three bits. Next, contents of the address bits will be explained, starting from the i-th bit as counted from the most significant bit. The three (i+6)-th to (i+8)-th bits BYTE0, BYTE1 and BYTE2 represent the byte addresses in one vector element, as described hereinbefore. On the other hand, the three (i+3)-th to (i+5)-th bits MMbit0, MMbit1 and MMbit2 indicate the ID numbers of the memory modules when they are to be assigned with the addresses in accordance with the interleave address assignment scheme, wherein the three i-th, (i+1)-th and (i+2)-th bits ADRbit0, ADRbit1 and ADRbit2 represent the access-based memory locations assigned with the above-mentioned addresses in the memory module.

When the element parallelism factor, i.e., the number of the memory modules, is "4", the bits MMbit1, MMbit2 represent the ID numbers of the memory modules while the bits ADRbit0, ADRbit1 and ADRbit2 and the bit MMbit2 represent the addresses in the memory module. On the other hand, when the element parallelism factor, i.e., the number of memory modules is "8", the bits MMbit0, MMbit1 and MMbit2 represent the ID numbers of the memory modules with the bits ADRbit0, ADRbit1 and ADRbit2 representing the addresses in the memory module.

In the memory system described above, the reason why the stride at which no degradation in the performance is involved when the element parallelism factor and hence the number of memory modules are "4" is equal to the stride at which no performance degradation is brought about when the element parallelism factor is "8" can be explained as follows.

At first, description will be directed to an access when the address incrementing value is "8" with the element parallelism factor being "4".

When the leading address is "0", the addresses for the access requests issued by the access request control units 191, 192, 193 and 194 in the first machine cycle are "0", "8", "16" and "24", respectively.

Since the addresses "0", "8", "16" and "24" are assigned to the memory modules MM0, MM1, MM2 and MM3, respectively, these access requests are sent out to the access request priority determining units 270, 271, 272 and 273, respectively.

In each of the access request priority determining units 270, 271, 272 and 273, the number of the access requests capable of being processed during one machine cycle is 1 (one). The access requests can be processed completely because only one access request is issued during one machine cycle.

For the succeeding access requests, same holds true.

This means that maximum performance can be assured.

Next, description will be directed to the access where the address incrementation value is "7".

The addresses for the access requests issued by the access request control units 191 (RQ0), 192 (RQ1), 193 (RQ2) and 194 (RQ3) in each machine cycle are such as illustrated in FIG. 20.

Since the addresses "0", "7", "14" and "21" in the first machine cycle are assigned to the memory modules MM0, MM3, MM3 and MM3, respectively, these access requests are sent out to the access request priority determining units 270, 271, 272 and 273, respectively.

The access requests for the addresses "0" and "7" are processed. On the other hand, the access requests for the addresses "14" and "21" are not processed but held in the access request queues of the access hold units 273-3 and 273-4, respectively, of the access request priority determining unit 273.

Because the addresses "28", "35", "42" and "49" in the succeeding machine cycle are all assigned to the memory module MM3, these access requests are sent out to the access request priority determining unit 273.

In the access request priority determining unit 273, the access requests to the addresses "28" and "35" from the access request buffer units 230 and 240 are accepted, the access requests to the addresses "42" and "49" issued from the access request buffers 250 and 260 are not accepted because the access request queue is not "unoccupied (empty)". Accordingly, these access requests are held by the access request buffers 250-2 and 260-2 of the access request buffer units 250 and 260, respectively.

When the access request priority determining circuit 273-7 is so designed that the older access request gets a higher priority, the access request for the address "14" is processed.

Figure 7:
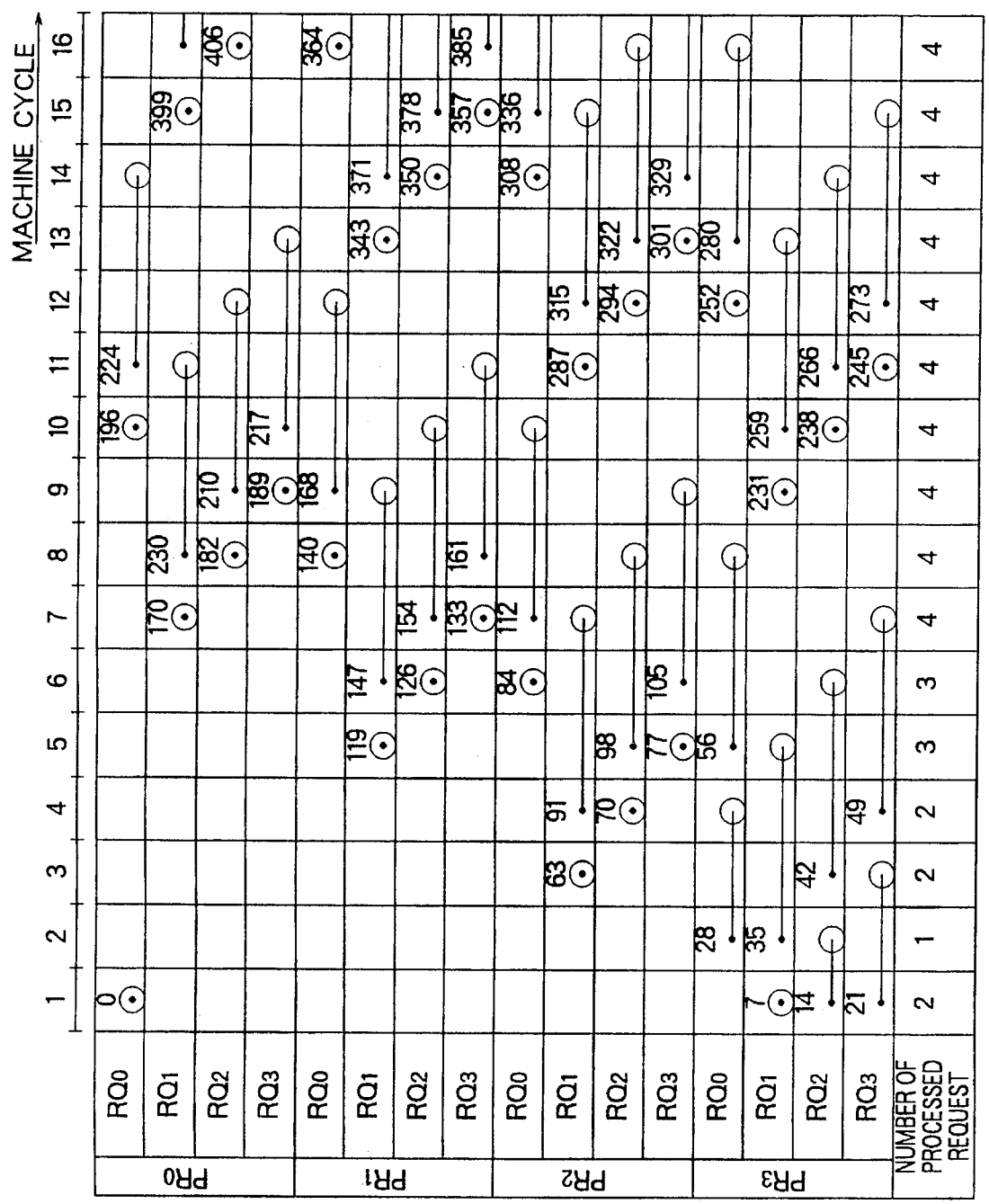
FIG. 7 is a view for illustrating machine cycles and states of access requests being processed in the vector processor shown in FIG. 1.
Figure 10:
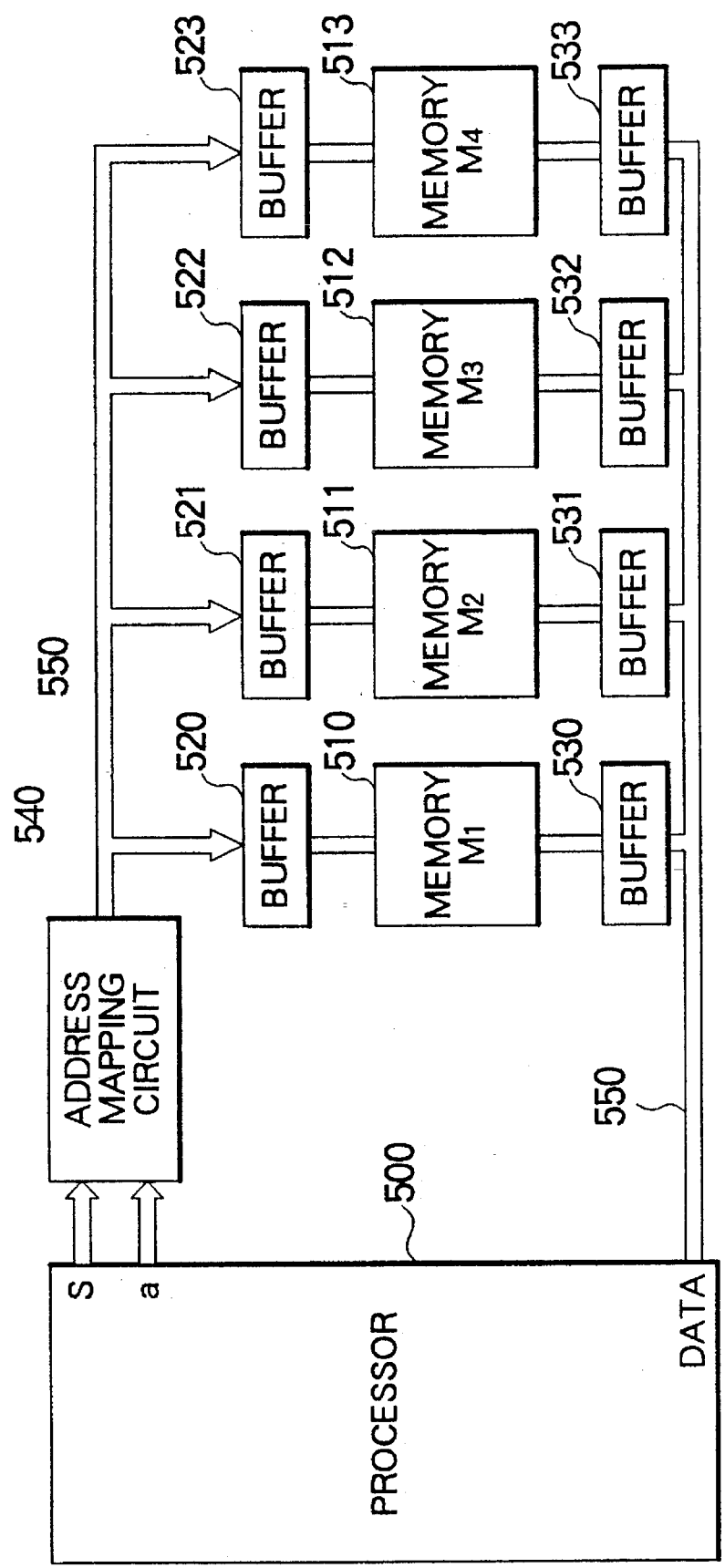
FIG. 10 is a view showing schematically a structure of a vector processor known heretofore.

FIG. 7 shows individual machine cycles and relevant states.

In the figure, symbols "PR0", "PR1", "PR2", and "PR3" designates the access request priority determining units 270, 271, 272 and 273, respectively. Further, solid points "." designate the timings at which the access requests are sent to the access request priority determining circuits 270-7, 271-7, 272-7 and 273-7. Furthermore, circles "o" indicate the timings at which the access requests are sent to the memory modules MM0, MM1, MM2 and MM3. Finally, connections or segments between the solid points and the circles indicate that the access requests are not selected by the priority determining circuits 270-7, 271-7, 272-7 and 273-7 but placed in the waiting state. The number of processing requests represents the number of access requests as processed in each of the machine cycles.

As can be seen in FIG. 7, the number of the processing requests is "14" after the seventh machine cycle inclusive, which means that a maximum processing performance is achieved.

The relation between the address incrementing value or the stride, to say in another way, and the access processing performance is same as that shown in FIG. 16.

When the stride is a multiple of "16" which is not a multiple of "32", the access processing performance is equivalent to a half of the maximum processing performance. On the other hand, when the stride is a multiple of "32", the access processing performance is reduced to one fourth of the maximum processing performance.

Except for the strides mentioned just above, there can be realized a highest access processing performance.

As can be seen from the comparison of FIG. 16 with FIG. 17, when the element parallelism factor is "4" in the vector processor according to the instant embodiment, the skewing scheme given by the expression (3) (which is equivalent to the expression (2) for the machine model where N=4) or shown in FIGS. 13 and 14 is adopted with the access request queue being provided in a number of stages given by the expression (4), while when the element parallelism factor is "8", the skewing scheme given by the expression (3) (which is equivalent to the expression (1) in the machine model where N=8) or shown in FIG. 16, whereby the stride incurring no performance degradation can be made same for both the above-mentioned cases.

Although the foregoing description has been made on the assumption that the skewing scheme represented by the expression (1) is adopted for the memory system of which element parallelism factor is "8", it should be understood that the invention is never exactly limited to such scheme. By way of example, the invention can equally be applied to the case where the skewing scheme defined by the expression (2) is adopted for the memory system in which the element parallelism factor is "8".

As is apparent from the foregoing description, there is obtained according to the present invention a vector processor in which the elements can be paralleled with a same stride involving no performance degradation between the memory systems which differ from one another in respect to the element parallelism factor or the number of memory modules.

What we claim is:

1. A vector processor, comprising:

a storage unit including a number (N) of memory modules, which number is given by a power of two and in which an interleave method of successively assigning continuous addresses to memory modules which differ from one to another is adopted;

a number (N) of access request circuits for issuing a number (N) of access requests in parallel for vector data stored in said storage unit; and a storage control apparatus for transferring the access requests issued by said access request circuits to desired memory modules;

wherein said storage control apparatus includes access request buffer units provided in one-to-one correspon-

19 dence to said access request circuits holding the access requests, respectively, and an access request priority determining circuit for arbitrating access conflict taking place upon transferring of the access requests from said plurality of access request circuit to said plurality of memory modules;

said storage control apparatus further including address decoder means for determining identification numbers of the transfer destination memory modules from addresses accompanying said access requests issued from said access request circuits, said address decoder means determining identification numbers of said memory modules which differ sequentially in accordance with a predetermined relation formula so long as said addresses vary with a predetermined skew periodicity (m), and which are shifted by a given number every time said address varies by said predetermined skew periodicity (m), said storage control apparatus further including means for making said predetermined skew periodicity (m) equal to skew periodicities of other vector processors which belong to a same system series (same machine or product series) of vector processors and which differ from one another mutually in respect to said number N.

2. A vector processor according to claim 1, wherein said predetermined periodicity (m) is a value proportional to a maximum value of the values (N) which any one of vector processors belonging to said vector processor system series takes on.

3. A vector processor according to claim 2, wherein said predetermined periodicity (m) is equal to said maximum value.

4. A vector processor according to claim 2, wherein said predetermined periodicity (m) is twice as large as said maximum value.

5. A storage control apparatus set forth in claim 1, further including an access request queue for holding access requests and disposed in precedence to said access request priority determining circuit, wherein said access request queue has a maximum stage number which does not exceed a value given by "m÷N−m÷(N× N).

6. A second vector processor in a system series including a plurality of vector processors having at least a first vector processor and said second vector processor, wherein said first vector processor includes: a storage unit including a number (N1) of memory modules in which an interleave method of successively assigning continuous addresses to memory modules which differ from one to another is adopted; a plurality of access request circuits for issuing a plurality of access requests in parallel for vector data stored in said storage unit; and a storage control apparatus for determining identification numbers of said memory modules from addresses contained in the access requests issued by said access request circuits such that the identification numbers of said memory modules are shifted by a given number every time said address is incremented by a predetermined number of memory modules (m1), said second vector processor comprising; a storage unit including a number (N2, where N2≠N1) of memory modules in which an interleave method of successively assigning continuous addresses to memory modules which differ from one to another is adopted; a plurality of access request circuits for issuing a plurality of access requests in parallel for vector data stored in said storage unit; and a storage control apparatus for deter-

20 mining identification numbers of said memory modules from addresses contained in the access requests issued by said access request circuits such that the identification numbers of said memory modules are shifted by a given number every time address is incremented by a predetermined number of memory modules (m2), wherein the value m1 is used as the value m2.

7. The second vector processor according to claim 6, wherein the value of N1 is larger than the value of N2.

8. The second processor according to claim 7, wherein the value of N1 is the largest in the plurality of vector processors belonging to said system series.

9. The second vector processor according to claim 8, wherein the value of N1 is used as the value of m2.

10. The second vector processor according to claim 8, wherein a value twice that of the value N1 is used as the value m2.

11. A second vector processor in a system series including a plurality of vector processors having at least a first vector processor and said second vector processor, wherein said first vector processor includes: a storage unit including a number (N1) of memory modules in which an interleave method of successively assigning continuous addresses to memory modules which differ from one to another is adopted; a number (N1) of access request circuits for issuing a number (N1) of access requests in parallel for vector data stored in said storage unit; and a storage control apparatus for determining identification numbers of said memory modules from addresses contained in the access requests issued by said access request circuits such that the identification numbers of said memory modules are shifted by a given number every time address is incremented by a predetermined number of memory modules (m1), said second vector processor includes; a storage unit including a number (N2, where N2≠N1) of memory modules in which an interleave method of successively assigning continuous addresses to memory modules which differ from one to another is adopted; a number (N2) of access request circuits for issuing a number (N2) of access requests in parallel for vector data stored in said storage unit; and a storage control apparatus for determining identification numbers of said memory modules from addresses contained in the access requests issued by said access request circuits such that the identification numbers of said memory modules are shifted by a given number every time address is incremented by a predetermined number of memory modules (m2), wherein the value m1 is used as the value m2.

12. The second vector processor according to claim 11, wherein the value of N1 is larger than the value of N2.

13. The second processor according to claim 12, wherein the value of N1 is the largest in the plurality of vector processors belonging to said system series.

14. The second vector processor according to claim 13, wherein the value of N1 is used as the value of m2.

15. The second vector processor according to claim 13, wherein a value twice that of N1 is used as the value m2.

16. A vector processor, comprising:

a storage unit including a number (N) of memory modules in which an interleave method of successively assigning continuous addresses to memory modules which differ from one to another is adopted;

a plurality of access request circuits for issuing a plurality of access requests in parallel for vector data stored in said storage unit; and a storage control circuit including address decoder unit for determining identification numbers of the memory modules from addresses contained in access requests issued from said access request circuits, said addresses being created under element parallelism factor N1, wherein the identification numbers of said memory modules are determined such that the identification numbers of said memory modules are shifted by a given number from a value of N1 every time address is incremented by a predetermined number (m1) of memory modules, and wherein even when the identification numbers of the memory modules are to be determined from addresses created under element parallelism factor N2, said address decoder unit determines the identification numbers of the memory modules such that the identification numbers of said memory modules are shifted by a given number from the value N1 every time address is incremented by the predetermined number (m1) of memory modules.

17. The vector processor according to claim 16, wherein said address decoder unit comprises:

a first means for determining the identification numbers of the memory modules from addresses contained in said access requests, said addresses being created under element parallelism factor N1; and a second means for determining the identification numbers of the memory modules from addresses contained in said access requests, said addresses being created under element parallelism factor N2; and a selection means for switching between said first means and said second means.

* * * * *